No. 795,030. PATENTED JULY 18, 1905.
E. P. DOLE.
NON-REFILLABLE BOTTLE.
APPLICATION FILED NOV. 15, 1904.
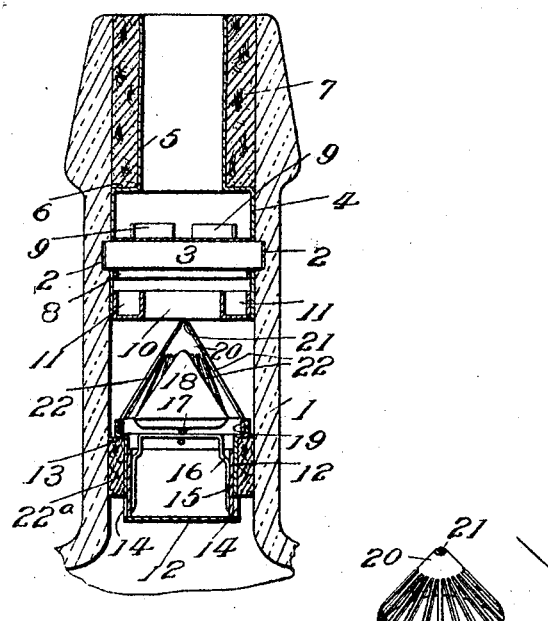
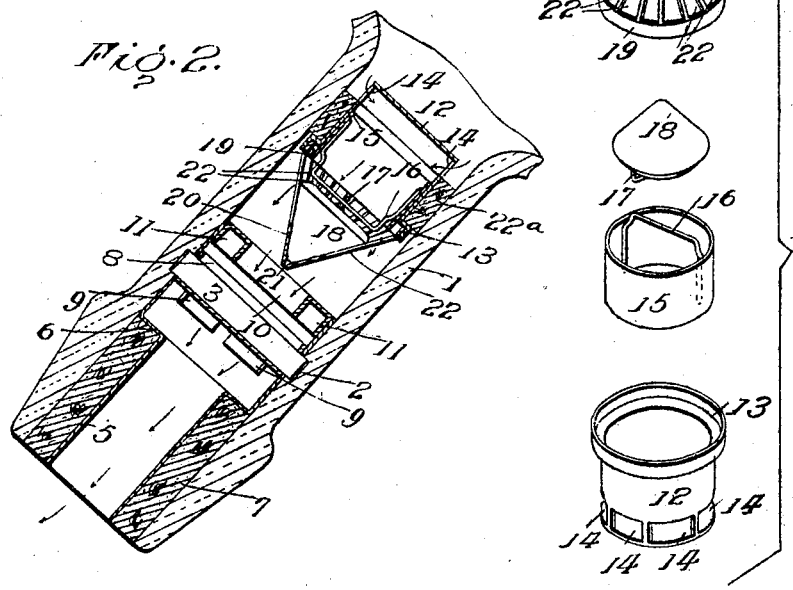
Witnesses
Inventor
Edmund P. Dole
Attorney No. 795,030. Patented July 18, 1905.

UNITED STATES PATENT OFFICE.

EDMUND P. DOLE, OF WASHINGTON, DISTRICT OF COLUMBIA.

NON-REFILLABLE BOTTLE.

SPECIFICATION forming part of Letters Patent No. 795,030, dated July 18, 1905.

Application filed November 15, 1904. Serial No. 232,830.

*To all whom it may concern:*

Be it known that I, EDMUND P. DOLE, a citizen of the United States, residing at Washington, in the District of Columbia, have invented certain new and useful Improvements in Non-Refillable Bottles; and I do hereby declare the following to be a full, clear, and exact description of the invention, such as will enable others skilled in the art to which it appertains to make and use the same.

My invention relates to certain new and useful improvements in non-refillable bottles.

My present invention has for its object to provide features of construction which will secure the certain, sensitive, and effective action of the valve which controls the outflow of the contents of the bottle and prevents the refilling of the same and which will enable my improvements to be produced and applied economically.

With these ends in view my invention consists in the details of construction and arrangement hereinafter more fully explained.

In order that those skilled in the art to which my invention appertains may know how to make and apply my improvements and fully understand the operation and advantages thereof, I will proceed to describe the same, referring by numerals to the accompanying drawings, in which—

Figure 1 is a central vertical section of the neck portion of a bottle with my improvements located therein and in the position to prevent the fraudulent refilling of the bottle. Fig. 2 is a similar section, but with the bottle inclined and the devices in position to permit the free outflow of the contents of the same; and Fig. 3 is a view showing in perspective and disassembled the several parts of the valve mechanism.

Similar reference-numerals indicate like parts in the several figures of the drawings.

1 represents the neck of a bottle formed with an interior circumferential groove 2, having parallel horizontal walls and adapted to receive the ends of a locking-spring 3 of a valve-protecting guard. This valve-protecting guard constitutes the subject-matter of another application for Letters Patent filed by me of even date herewith, Serial No. 232,829; but as it is an important and necessary feature of a non-refillable bottle I will point out the particular features of construction of the same. This guard consists of an enlarged cylindrical base portion 4, open at the bottom, and an upper cylindrical portion 5 of less diameter than the base connected by a shoulder 6. The diameter of the lower or base portion is substantially the same as the interior of the neck 1 of the bottle, and the upper portion is surrounded by a tubular packing of cork or other suitable material 7 to produce a liquid-tight joint. Within the enlarged portion 4, about midway thereof, is located a cup-shaped piece 8, open at the bottom and having openings or gateways in its top, formed by cutting said top at its circumference and turning the same upwardly to form vertical guards 9, which protect the radial approach to the openings or gateways by any instrument used fraudulently in an effort to tamper with the valve mechanism of the bottle. The side wall of this cup-shaped piece 8 is formed with diametric slots for the passage of a locking-spring 3, and the enlarged portion 4 of the guard is also provided with diametric openings through which the ends of the spring pass in locating themselves within the circumferential recess or groove 2 in the neck of the bottle.

Located within the open bottom end of the portion 4 of the guard is another cup having a central liquid passage-way 10 and an annular pocket 11. This cup is retained in position by frictional contact with the guard portion 4.

From the construction described it will readily be understood that should an attempt be made to pass any sort of a tool or instrument through the guard with a view to fraudulently operate the valve below the vertical guards 9 would prevent the lateral or radial movement of said instrument toward the openings in the top of the cup 8, and that if for any reason said instrument gained access thereto and passed down in a vertical direction it would be led into the annular pocket 11 of the cup at the lower end of the portion 4 and could not reach the central liquid passage-way 10, and hence the valve mechanism below could not be attacked.

I will now proceed to describe the valve mechanism, which is located within the neck of the bottle at any desired distance below the guard, and particular reference is made to Fig. 3. This valve mechanism consists of a sheet-metal tubular member 12, having a closed bottom and an open top terminating in a flanged seat 13. Adjacent to the bottom the wall of this member is formed with radial liquid passage-ways 14. Located within the member 12 is a tubular member 15, which is open at both ends and adapted to reciprocate within the member 12, so that when it assumes the position shown in Fig. 2 the contents of the bottle are free to pass through the passage-ways 14, but when in the position shown in Fig. 1 said passage-ways are closed. The upper end of this part 15 is provided with a link or bridge 16, which interlocks with a similar link 17, arranged transversely and secured to the bottom of an operating-weight 18 of the form shown. Within the flanged seat 13 of the member 12 is located the ring-base 19 of a cone-shaped cap-piece, the upper end of which is unbroken except by an axial orifice 21, and between the portion 20 and the ring-base 19 the metal is cut away to form a series of radiating liquid passage-ways 22. The cap-piece and the tubular member 12 are accurately fitted together, so that when the several parts are properly assembled they will be held in fixed relation by frictional contact. I do not, however, wish to be confined in this respect, as any suitable means may be employed for locking these two parts together. The enlarged seat portion 13 of the member 12 produces a shoulder below which and surrounding said member is arranged a tubular packing of cork 22$^a$ or other suitable packing material, which produces a liquid-tight joint between the valve mechanism and the interior surface of the neck of the bottle and maintains the valve mechanism in fixed relation with the bottle at any desired locality. The weight 18, as will be seen, is curved at the point of juncture between its beveled side and base in order that the friction between the weight and the interior inclined surface of the cap may be diminished and at the same time to provide for a full and unobstructed reciprocation of the weight. From the construction of this weight and its inclosing cap it will be seen that there are no shoulders or projections with which the weight might contact and that by reason of the form of the weight and the series of passage-ways 22 in the cap the frictional contact between the weight and cap is reduced to a minimum, while at the same time any cohesion between the weight and cap is avoided, as there is but a small surface upon which liquid can be retained. The orifice 21 in the apex of the cap prevents the accumulation of liquid or the production of a vacuum at that locality, and hence the possibility of the weight adhering to the cap is prevented.

When all of the parts of the valve mechanism are assembled and located within the neck of the bottle, as shown at Fig. 1, and the guard is properly located, as heretofore explained, a practical non-refillable bottle is produced.

Having described the construction and arrangement of my improved devices, I will now explain their operation. Assuming that the bottle has been filled and the parts have been assembled and located within the neck of the bottle and a suitable cork has been placed in the upper portion 5 of the guard, the bottle and contents are in condition to go into the market. When it is desired to extract the contents of the bottle, after first removing the cork from the upper end of the guard the bottle is tilted into about the position shown at Fig. 2, whereupon the weight 18 will move by gravity into the position there shown, and by reason of the connection of said weight with the tubular member 15 the latter is moved from the position shown at Fig. 1 into the position shown at Fig. 2, and consequently the lower end of the member 15 has uncovered the passage-ways 14 in the member 12, so that the liquid contents of the bottle are free to travel in the direction indicated by the arrows shown in Fig. 2 and escape from the bottle, first passing through the passage-ways 14, thence freely through the openings 22 in the cap, thence through the central opening 10 in the cup at the base of the valve-guard, and thence through the openings between the guards 9 and the circumference of the cup 8 and out through the reduced portion 5 of the guard. Should an effort be made to refill the bottle without the ability to hold the valve open by fraudulent means and with the bottle in the position shown at Fig. 1, it will readily be understood that the valve member 15 by reason of its own weight supplemented by that of the weight 18 will necessarily assume the position shown in said figure, and consequently the gateways or passages 14 will be absolutely closed and any liquid introduced into and through the guard will only tend to hold the member 15 in its valve-closing position. Should an attempt be made to fill the bottle in an inclined position, such as shown at Fig. 2, and in which position, as before explained, the contents are free to flow out, the air contained within the bottle will necessarily prevent the introduction of liquid by any ordinary applied force, and if the neck of the bottle should be raised above the angle shown the weight 18, which is in contact with the inclined wall of the cap, will by reason of its sensitive response to the law of gravitation travel toward the tubular valve-receptacle 12, and by reason of its connection with the member 15 the latter will be carried into a position to close the passage-ways or gates 14, and thus effectually prevent the inflow of liquid.

While I have shown the cap of the valve mechanism, as well as the weight 18, conical in form and tapered to an angle of about ninety degrees and have found from practical experience that such construction renders the valve mechanism very sensitive in opening and closing the passage-ways 14 of the member 12, I do not wish to be limited to any particular angle of obliquity in these parts so long as they operate in the manner described. Nor do I wish to be confined to exact proportions in any of the several parts constituting my invention, although I have found that the proportions shown in the drawing (which is on the scale of a full-quart-size bottle) successfully secure the results sought by my invention.

I have shown the valve mechanism as located in the neck of the bottle near the breast of the same and with the guard above the valve mechanism and close thereto and have found these relations as entirely satisfactory; but I wish it to be understood that I do not desire to be limited in this respect so long as the location and relation of the several parts are such as to secure the desired results.

Having described the construction, operation, and advantages of my improved non-refillable bottle, what I claim as new, and desire to secure by Letters Patent, is—

1. In a non-refillable bottle, a tubular valve receptacle or seat, located within the neck of the bottle and having a closed bottom and open top and with liquid passage-ways in the side wall adjacent to the closed bottom; an enlarged upper end constituting a seat for a cap and producing an annular shoulder; an open-ended tubular valve member adapted to reciprocate within the valve-receptacle; a cone-shaped weight connected by transverse links with the valve member; and a cap seated within the upper end of the valve-receptacle and having its exposed upper portion cone-shaped and formed with radiating fluid-passages, in combination with means for protecting said valve mechanism from fraudulent manipulation, substantially as hereinbefore set forth.

2. In a non-refillable bottle provided with valve mechanism such as described, a valve-closing member 15, provided at its upper end with a link 16; a weight 18, provided with a transverse link 17, said member and weight connected together by said links, the valve member 15, and weight 18, held in reciprocating relation with the valve-receptacle, and a cone-shaped cap having radiating liquid-passages and an orifice in its apex, substantially as hereinbefore set forth.

3. In a valve mechanism such as described for non-refillable bottles, the valve-receptacle formed with a closed bottom and open top and with liquid passage-ways in the side wall adjacent to the bottom and with an enlarged flanged seat at its upper end; a reciprocating valve located within the valve-seat, and a cone-shaped cap seated within the upper end of the valve-receptacle and provided with liquid-passages, substantially as and for the purpose set forth.

4. In a valve mechanism for non-refillable bottles, a valve-receptacle located within the neck of the bottle and formed with ports in the side wall thereof; a reciprocating valve member located within the valve-receptacle and adapted through its reciprocation to open and close the ports in the valve-receptacle; an actuating-weight connected with the upper end of the valve member, and a weight-confining cap seated within the open end of the valve-receptacle and having its exposed portion converging and formed with radiating liquid-passages, substantially as and for the purpose set forth.

5. In a non-refillable bottle such as described, in combination with a valve-seat located within the neck of the bottle and held therein by a liquid-tight packing or gasket and provided with a cone-shaped cap, a reciprocating valve and a cone-shaped weight loosely connected together, located within the valve-seat and held therein by the cone-shaped cap, substantially as and for the purpose set forth.

In testimony whereof I have signed my name to this specification in the presence of two subscribing witnesses.

EDMUND P. DOLE.

Witnesses:
D. G. STUART,
ROBERT J. FISHER.